(12) United States Patent
Lundell (10) Patent No.: US 8,222,593 B2
(45) Date of Patent: Jul. 17, 2012

(54) STOCK THICKNESS ANOMALY DETECTION DEVICE

(75) Inventor: Dennis Alan Lundell, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 90 days.

(21) Appl. No.: 12/888,551

(22) Filed: Sep. 23, 2010

(65) Prior Publication Data

US 2012/0074302 A1 Mar. 29, 2012

(51) Int. Cl.
*G01D 5/34* (2006.01)
*G01N 21/86* (2006.01)

(52) U.S. Cl. .............................. 250/231.11; 250/559.27
(58) Field of Classification Search ............. 250/231.11, 250/231.13–231.18, 559.27
See application file for complete search history.

(56) References Cited

U.S. PATENT DOCUMENTS

| | | | |
|---|---|---|---|
| 1,875,617 A | 9/1932 | Lee | |
| 3,886,562 A * | 5/1975 | Atzinger et al. | 346/32 |
| 3,894,232 A * | 7/1975 | Laspesa | 250/231.13 |
| 5,029,837 A | 7/1991 | Uchiyama | 271/110 |
| 5,213,318 A | 5/1993 | Newhall | 270/55 |
| 7,370,862 B2 * | 5/2008 | Ahn et al. | 271/265.01 |
| 7,693,802 B2 | 4/2010 | Defosse | 705/407 |
| 2003/0116724 A1 | 6/2003 | Kim | 250/559.27 |
| 2003/0209657 A1 | 11/2003 | Vejtasa | 250/231.13 |

FOREIGN PATENT DOCUMENTS

| | | |
|---|---|---|
| DE | 10237767 | 11/2003 |
| WO | 2004/022323 | 3/2004 |

OTHER PUBLICATIONS

European Search Report completed Jan. 9, 2012.

* cited by examiner

*Primary Examiner* — Thanh X Luu
(74) *Attorney, Agent, or Firm* — Richard B. O'Planick (57) ABSTRACT

A detection device detects a thickness anomoly region within a strip of stock and includes a first roller operatively rotating as the strip of stock passes over a first roller surface; a pivotally mounted pinch roller positioned to operatively pivot about a pivot axis against the strip of stock passing over the first roller; a photoeye mask positioned to rotate about the pivot axis responsive to pivotal movement of the pinch roller; a photoeye slot within the photoeye mask extending between a slot leading end and a slot trailing end; and the transmitting and receiving optical devices positioned on opposite sides of the photoeye slot of the photoeye mask and operative in an photoeye mask-aligned position to project a centered through-beam through the photoeye slot between the transmitting and receiving optical devices. The through-beam is blocked by the photoeye mask as the photoeye mask operatively rotates a preset deflection angle in either direction out of the photoeye mask-aligned position and into a photoeye mask blocking position. first and second directions. The duration of the disruption of signal between the optical transmitting device and the receiving device indicates whether the anomaly encountered within the strip of stock is a splice or a stock-out occurrence.

20 Claims, 10 Drawing Sheets

STOCK THICKNESS ANOMALY DETECTION DEVICE

FIELD OF THE INVENTION

The invention relates generally to splice detection devices used in tire building manufacturing lines and, more particular, to splice detection devices that detect overlap splices in stock prior to being wound onto a tire.

BACKGROUND OF THE INVENTION

Overlap splices are a by-product of a non-continuous stock preparation process and are common in conventional tire building. Two notable examples are ply stock and spiral overlay stock when it is wound on large spools. Both have lapped splices built in during the stock preparation process to form a continuous strip or sheet. The splices also hold the strip or sheet together during the tire building process. Since they create a discontinuity in the tire, these double-thick splices may prove undesirable and may be unacceptable in a tire.

Accordingly, it is desirable to provide a means of sensing overlap splices in stock prior to being wound onto a tire.

SUMMARY OF THE INVENTION

According to an aspect of the invention, a detection device detects a thickness anomaly region within a strip of stock and includes a first roller operatively rotating as the strip of stock passes over a first roller surface; a pivotally mounted pinch roller positioned to operatively pivot about a pivot axis against the strip of stock passing over the first roller; a photoeye mask positioned to rotate about the pivot axis responsive to pivotal movement of the pinch roller; a photoeye slot within the photoeye mask extending between a slot leading end and a slot trailing end; and the transmitting and receiving optical devices positioned on opposite sides of the photoeye slot of the photoeye mask and operative in an photoeye mask-aligned position to project a centered through-beam through the photoeye slot between the transmitting and receiving optical devices.

According to another aspect, the through-beam is blocked by the photoeye mask as the photoeye mask operatively rotates a preset deflection angle out of the photoeye mask-aligned position and into a photoeye mask blocking position. The preset deflection angle required to rotate the photoeye mask between the photoeye mask-aligned and photoeye mask blocking positions is adjustable.

The photoeye mask slot tapers in width between the leading and trailing ends, in a further aspect, and the transmitting and receiving optical devices position along the photoeye mask slot is adjustable to selectively calibrate the detection device to differing nominal thicknesses of stock.

In yet a further aspect, the photoeye mask rotates in opposite first and second directions about the pivot axis responsive to corresponding pivotal movement of the pinch roller in opposite first and second directions. Rotation in the first direction of the photoeye mask into the first photoeye mask blocking position is operatively indicative of a stock-out condition between the first roller and the pinch roller and rotation in the second direction of the photoeye mask is operatively indicative of the presence of a splice within the strip of stock between the first roller and the pinch roller. The duration of the disruption of signal between the optical transmitting device and the receiving device indicates whether the anomaly encountered within the strip of stock is a splice or a stock-out occurrence.

Definitions

BRIEF DESCRIPTION OF THE DRAWINGS

The invention will be described by way of example and with reference to the accompanying drawings in which.

DETAILED DESCRIPTION OF THE INVENTION

Referring initially to FIGS. 1, 2, 3, 4, and 5, a detection device 10 is shown for detecting thickness anomaly within a strip stock. The detection device 10 is useful for myriad applications such as in a tire building line having non-continuous stock preparation. The ply stock and spiral overlay stock in conventional tire building are wound on large spools and have splices built in during stock preparation in order to form a continuous strip or sheet. Such splices create a discontinuity in the tire and are generally undesirable. The device 10 operates in one aspect to detect the presence of such double thickness overlap splices in the stock and, additionally, as will be explained, provide the dual function of detecting a stock-out situation for a wide range of stock thicknesses.

FIGS. 1 through 5 illustrate a positioning of device 10 at some convenient location after a strip or sheet of stock 72 has been removed from a stock spool (not shown). The device assembly 10 includes a mounting plate 12 having a pinch roller 14 and stationary roller 20 rotationally mounted thereto. The pinch roller 14 is rigidly affixed to a pivot arm 16 that connects to a pivot shaft 18 extending through the plate 10. Pinch roller 14 rotates about a pin 19 as shown. The stationary roller 20 receives the strip of stock 72 thereabout and may be driven such as by motor 23 or free wheeling. The pinch roller 14 is mounted on the pivot arm 16 which is rigidly attached to the pivot shaft 18. Shaft 18 is free to pivot in a bearing housing 40 mounted to the plate 12.

Figure 3:
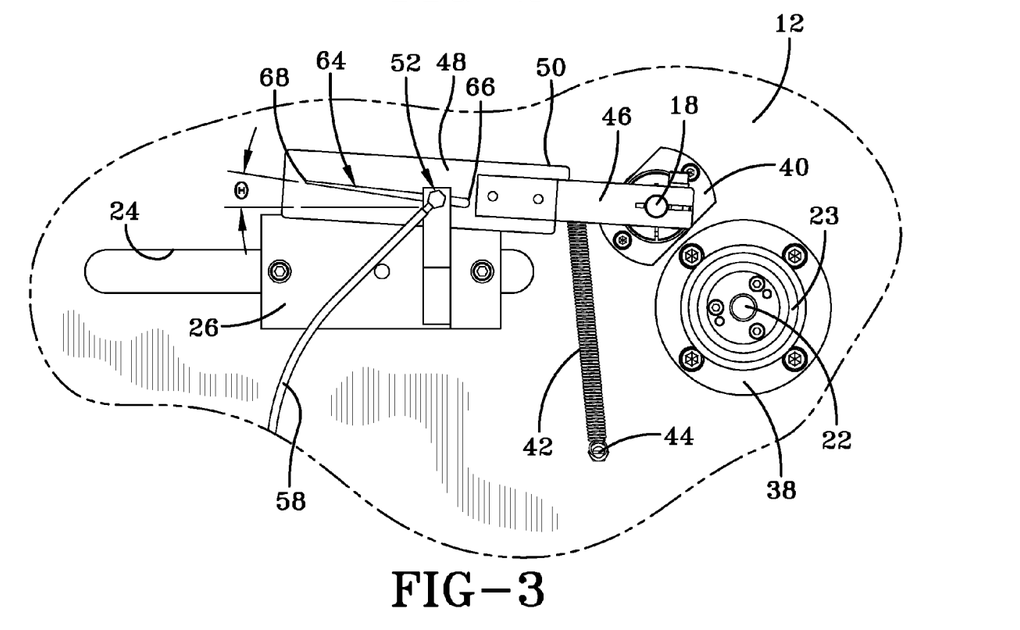
FIG. 3 is a rear plan view of the detection device assembly.
Figure 4:
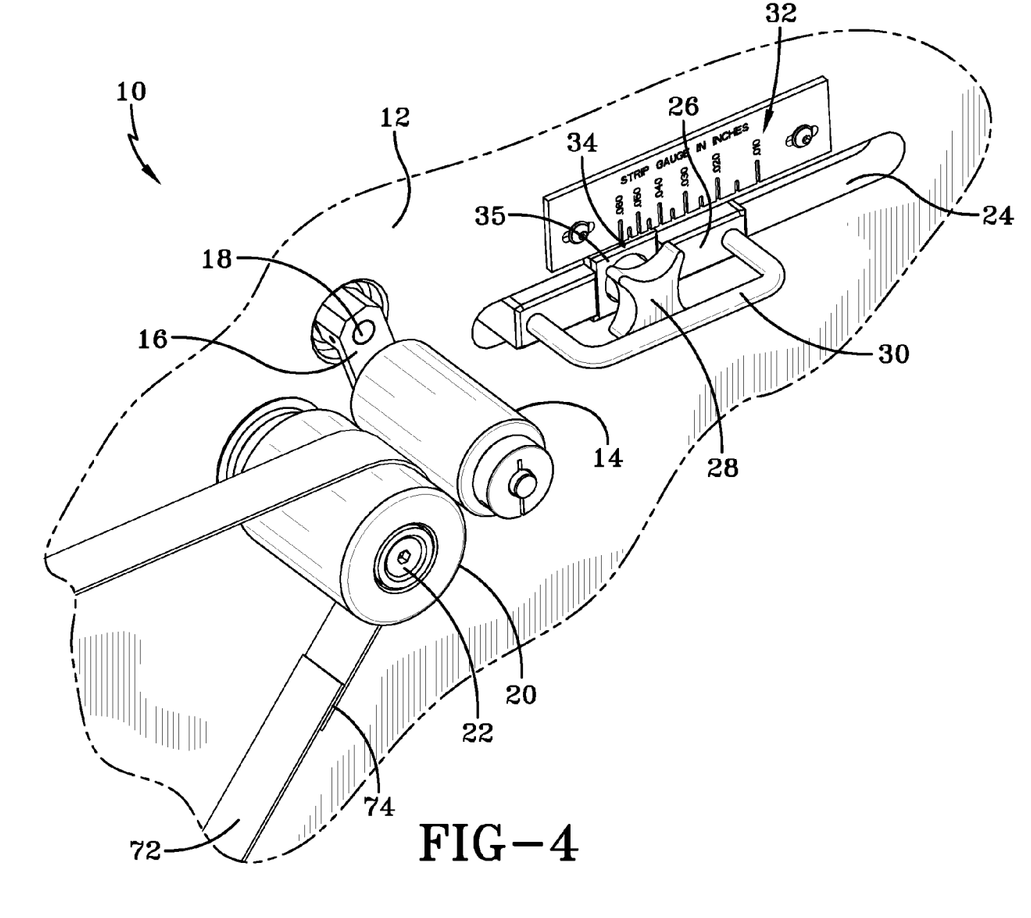
FIG. 4 is a front perspective view of the device roller assembly.
Figure 5:
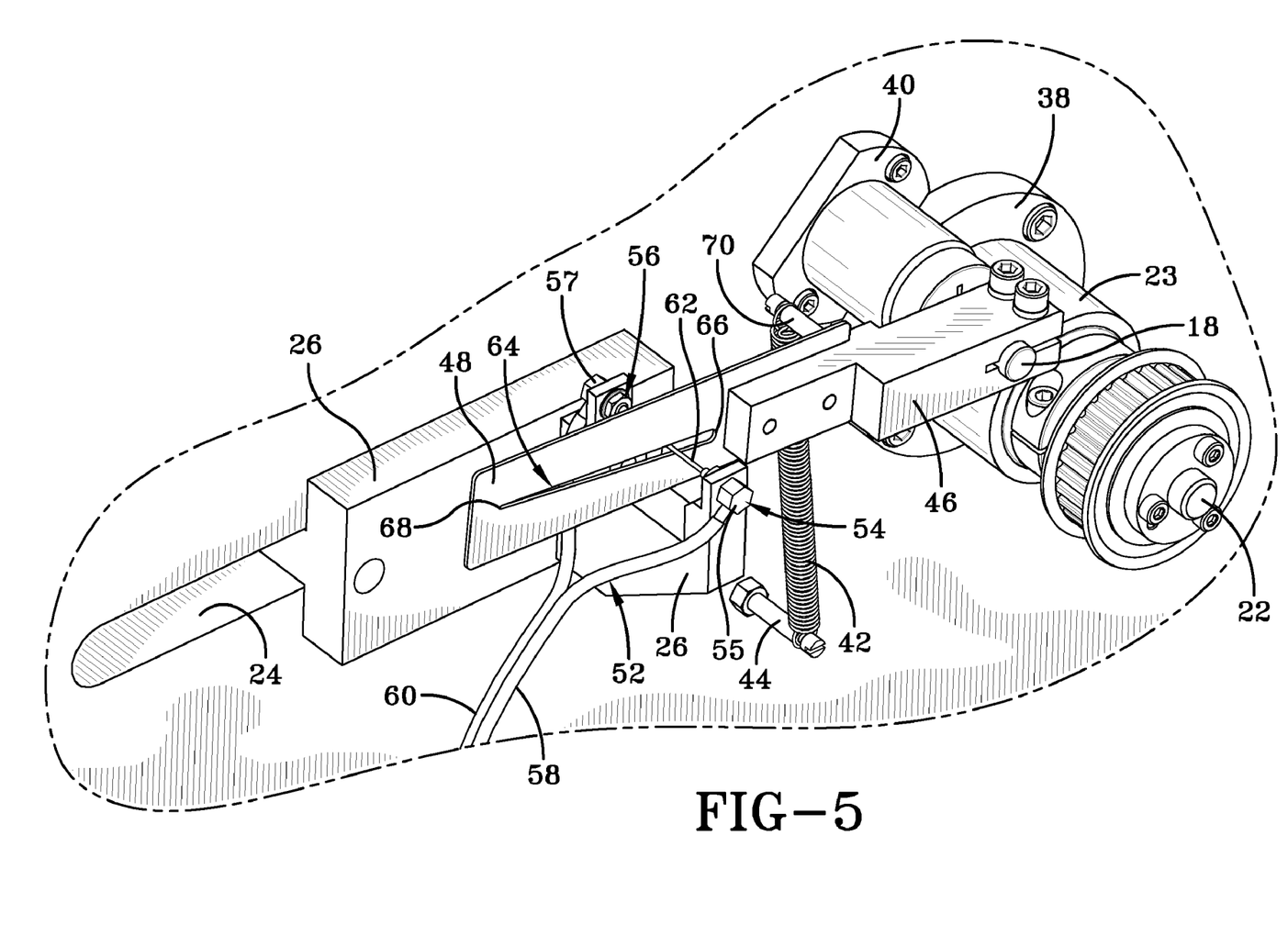
FIG. 5 a rear perspective view of the detection device assembly.

On the back side of the plate 12 a photoeye mask 48 and pivot arm 46 are rigidly clamped to the pivot shaft 18. The photoeye mask is a thin plate having an elongate photoeye slot 64. The slot 64 is tapered between a leading slot end 66 and a trailing slot end 68 with at a taper angle of 2.45 degrees. The slot 64 is further cut so that the slot centerline is at an angle of 3.96 degrees to a long edge 50 of the mask 48 as shown. The slot taper angle provides a narrower gap when the photoeye is adjusted by moving it to the left, which is done for thinner gauge strips. The combination of moving the sensing point further from the pinch roller pivot shaft and the narrower slot there makes it more sensitive when the stock is thinner. The sizing of the slot and taper angle is done to allow the device to trip at approximately +/−40 percent of the stock gauge, rather than at a specific thickness.

When a different gauge stock is put into the sensor the nominal position of the arm will change, as the pinch roller will be contacting a different thickness. The slot angle is set so that the photoeye beam will be centered in the slot with a single thickness being pinched (nominal position) with the sensor adjusted for the gauge.

A through-beam photoeye device 52 is mounted to the plate 12 and includes an optical transmitter 54 and receiver 56 pair. A pair of photoeye cables 58, 60 deliver a light beam to the pair 54, 56 and transmit the return signal back to a processor (not shown). The through beam photoeye pair 54, 56 is mounted so that by means of a through-beam of light 62 it either looks through the photoeye slot 64 or is blocked by the mask 48. The through-beam of light 62 is small in diameter, approximately one mm, by using flexible fiber-optic photoeye cables 58, 60 mounted with right angle tips 55, 57 oriented toward the slot 64.

A spring 42 is connected between the mounting plate 12 and the photoeye mask pivot arm 46 through spring posts 44, 70, respectively. The spring force on the pivot arm 46 provides a small torque to the pivot shaft 18 that forces the pinch roller 14 against the strip 72. The right angle through beam fiber-optic tips 55, 57 are mounted to a photoeye slide bracket 26. The bracket 26 is mounted in a linear slot 30 in the mounting plate 12, providing an axis of movement used for adjusting the splice detection device for different strip thicknesses. The bracket location for a given strip gauge is set by aligning a groove 34 in a bracket T-bar 35 with an appropriate mark on a strip gauge adjustment scale 32 mounted on the front side of the mounting plate 12. A handle 30 facilitates repositioning of the bracket 26 along the scale 32 to a desired strip thickness value 36. The bracket 26 is locked at the desired location with a locking screw and knob combination 28 forcing the T-bar 35 against the edge of the slot 30 when tightened.

Figure 1:
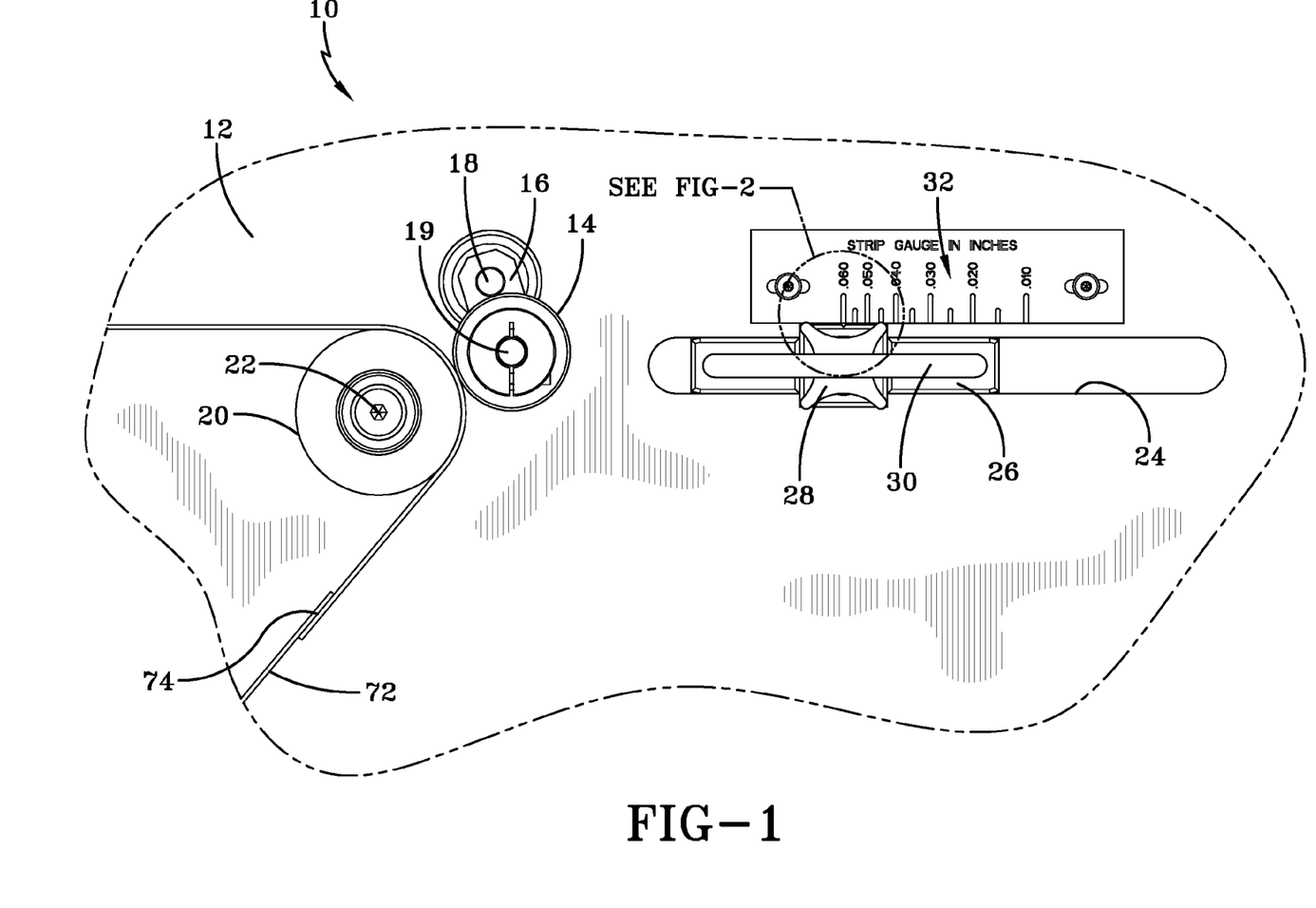
FIG. 1 is a front plan view of the detection device assembly.
Figure 2:
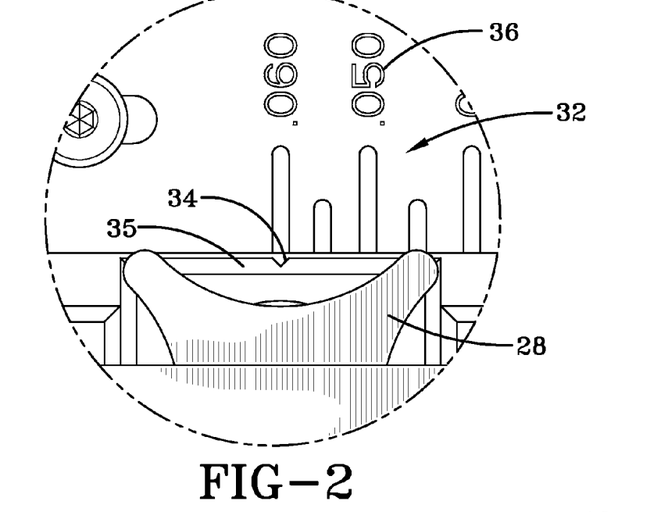
FIG. 2 is an enlarged partial front plan view of the adjustment scale of the device.
Figure 6:
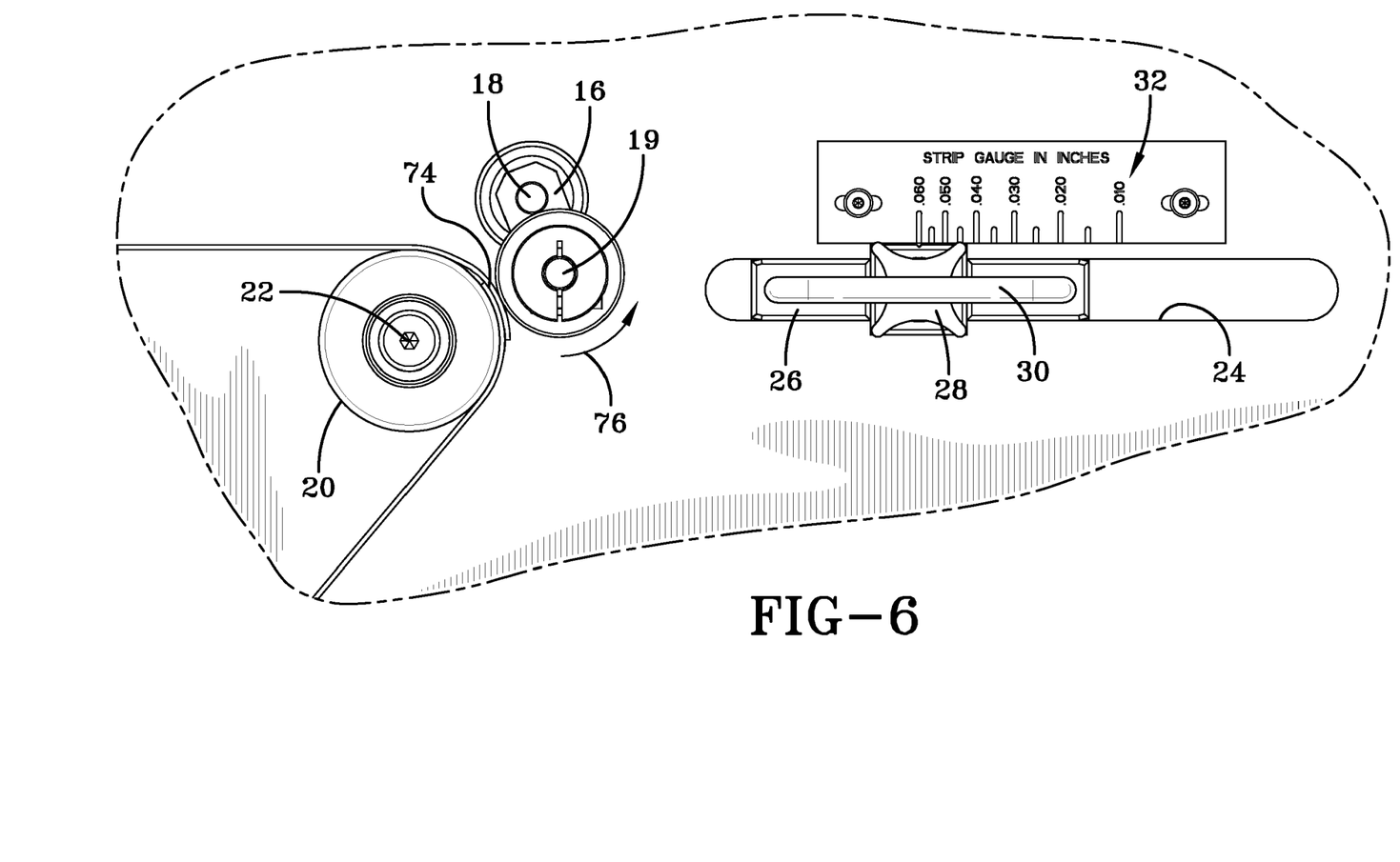
FIG. 6 is a front plan view of the detection device encountering a strip stock splice.
Figure 7:
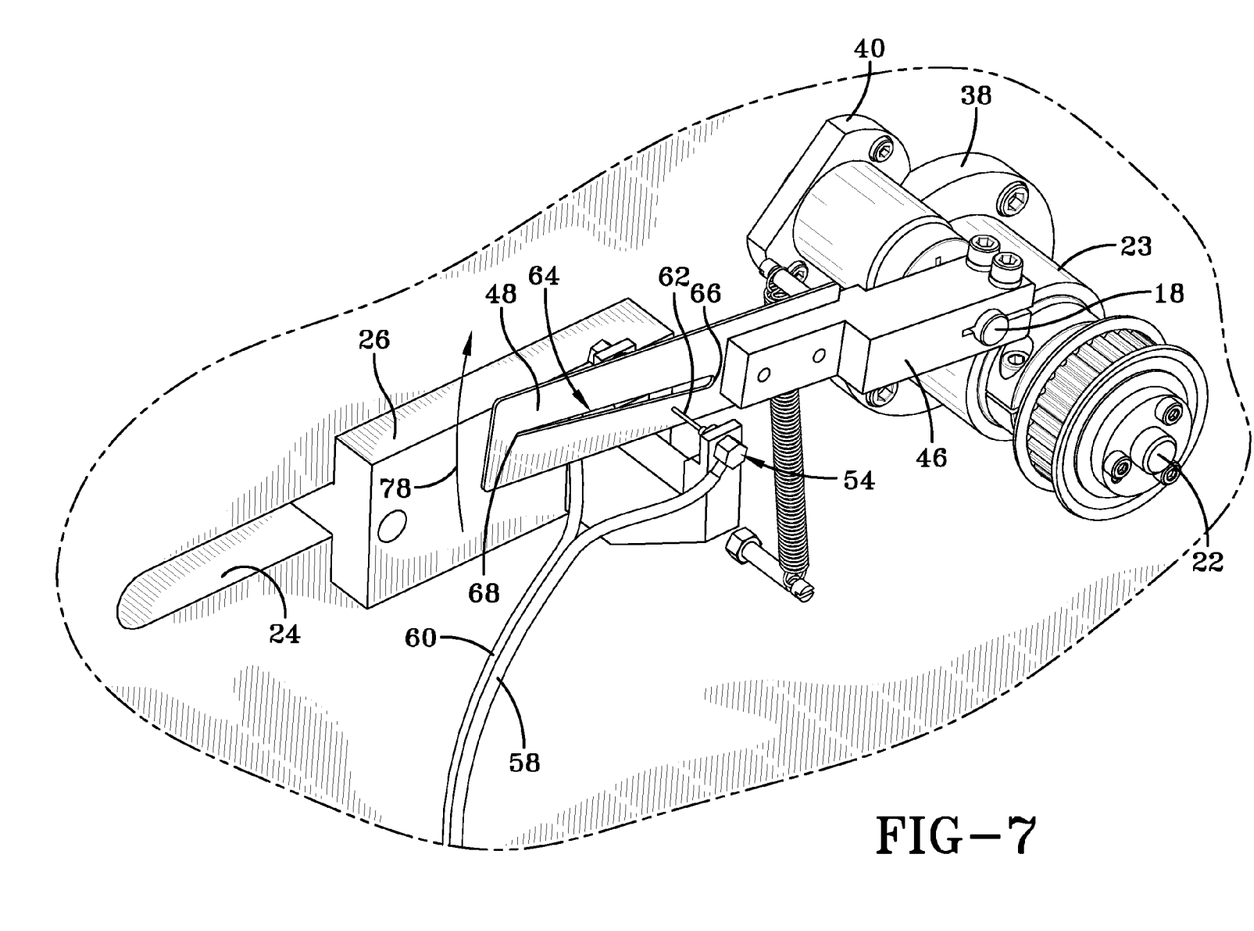
FIG. 7 is a rear perspective view of the detection device responding to a splice encounter.

When the strip 72 is threaded as shown in FIG. 1 and the photoeye slide bracket 26 is adjusted to the proper stock nominal thickness along the scale 32, the through-beam 62 of the photoeye device 52 will be aligned at an appropriate position along the slot 64 and with the center of the tapered slot 64 in the photoeye mask 48. When a splice 74, constituting a thickness anomaly, passes between the pinch roller 14 and the stationary roller 20, the extra thickness will cause the pinch roller 14 to move in direction 76, causing the pivot shaft 18 to rotate a commensurate extent. Rotation of the shaft 18 forces photoeye mask pivot arm 46 to pivot, forcing a pivotal movement of the mask 48 in the direction of arrow 78. Movement of the mask 48 moves the tapered slot 64 out of alignment with the photoeye beam 62, blocking it. See FIGS. 6 and 7. This provides a momentary signal interpreted by the control system that a splice has been detected. Once the splice 74 passes the rollers 14, 20, spring 42 causes the pinch roller 14 to move against the strip 72, causing the mask 48 to resume an aligned position wherein the beam 62 is re-centered through the through slot 64. A momentary signal thus signals and is interpreted as the presence of a splice.

Figure 8:
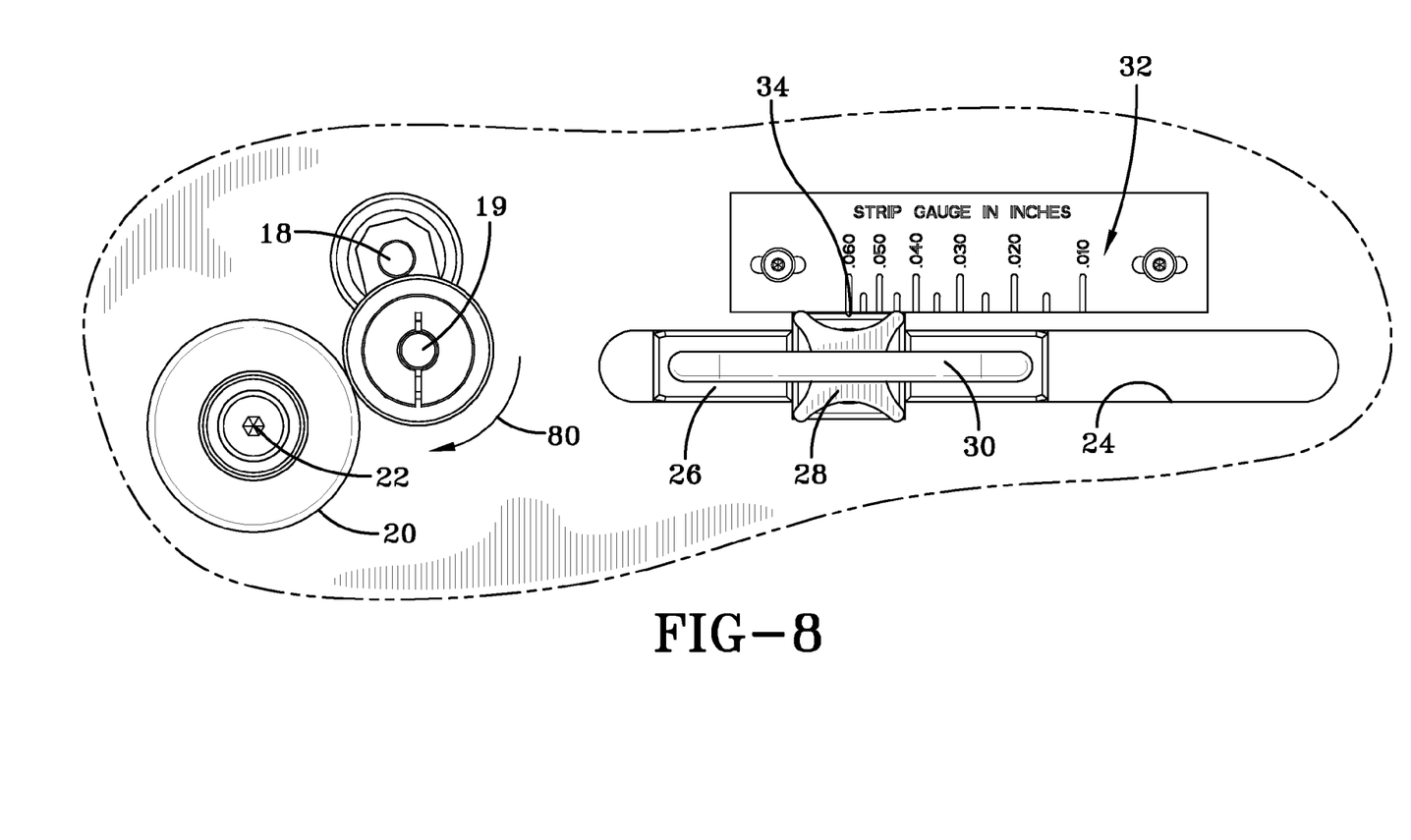
FIG. 8 is a front plan view of the detection device encountering a stock-out occurrence.
Figure 9:
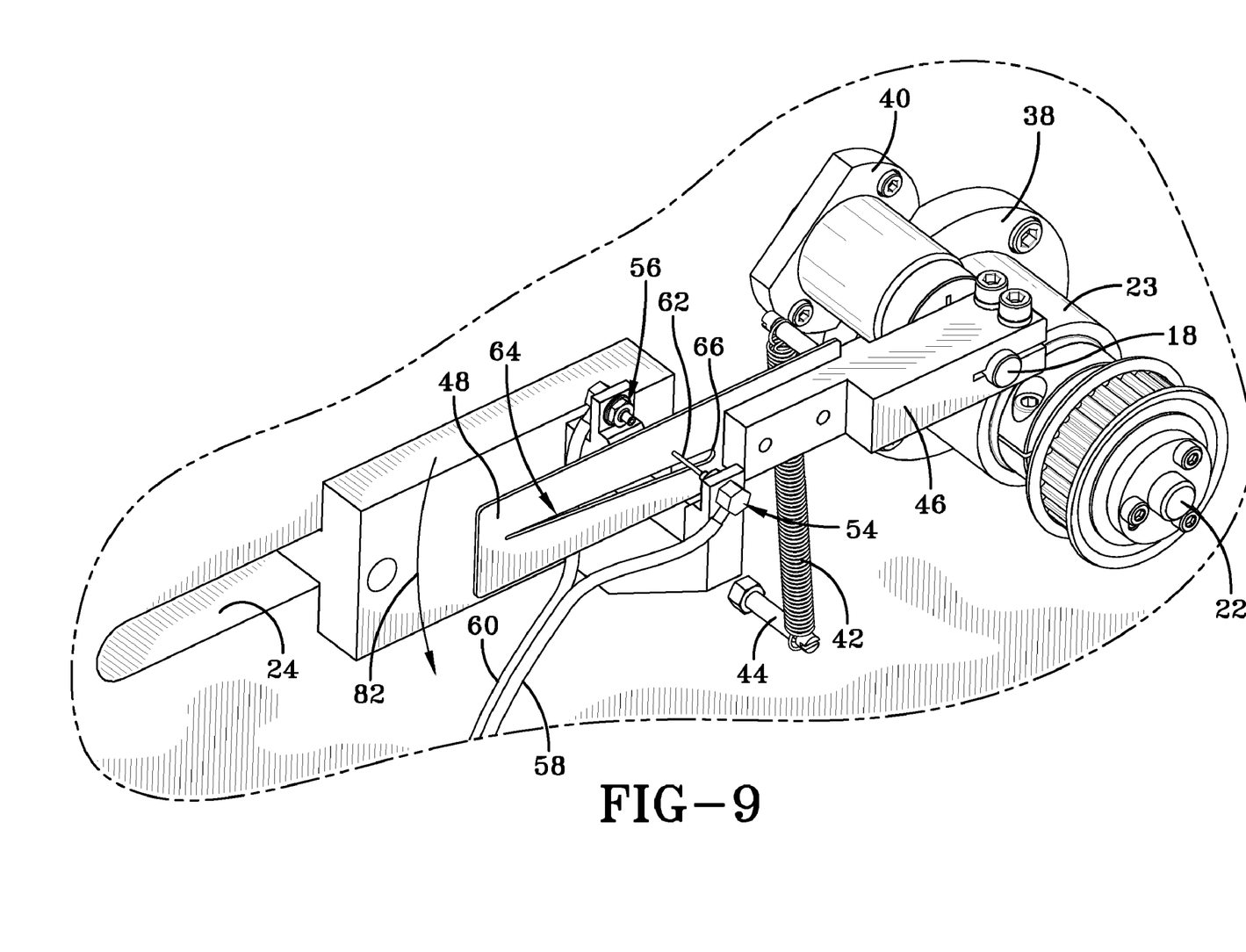
FIG. 9 is a rear perspective view of the detection device responding to the stock-out occurrence.

As shown in FIGS. 8 and 9, should the end of the strip 72 pass between the pinch roller 14 and the stationary roller 20, the absence of the strip will cause the pinch roller to move in direction 80 (opposite to the direction 76), causing the pivot shaft 18 to directionally rotate (in an opposite direction to shown by FIGS. 6 and 7) a commensurate extent. Rotation of the shaft 18 forces photoeye mask pivot arm 46 to pivot, forcing a pivotal movement of the mask 48 in the direction of arrow 82 (opposite to arrow 78 of FIGS. 6 and 7). Movement of the mask 48 moves the slot 64 out of alignment with the photoeye beam 62, blocking it. This produces a signal of indefinitely long duration interpreted by the control system as indicative of a stock-out occurrence, i.e. that the strip no longer is present between the rollers. Once strip stock is re-threaded between the rollers, the mask 48 is repositioned from a blocking position back into an aligned position that re-centers the beam 62 through the through-slot 64. A signal of longer duration thus may be interpreted to signal a stock-out event while a signal of shorter duration the presence of a splice.

Figure 10:
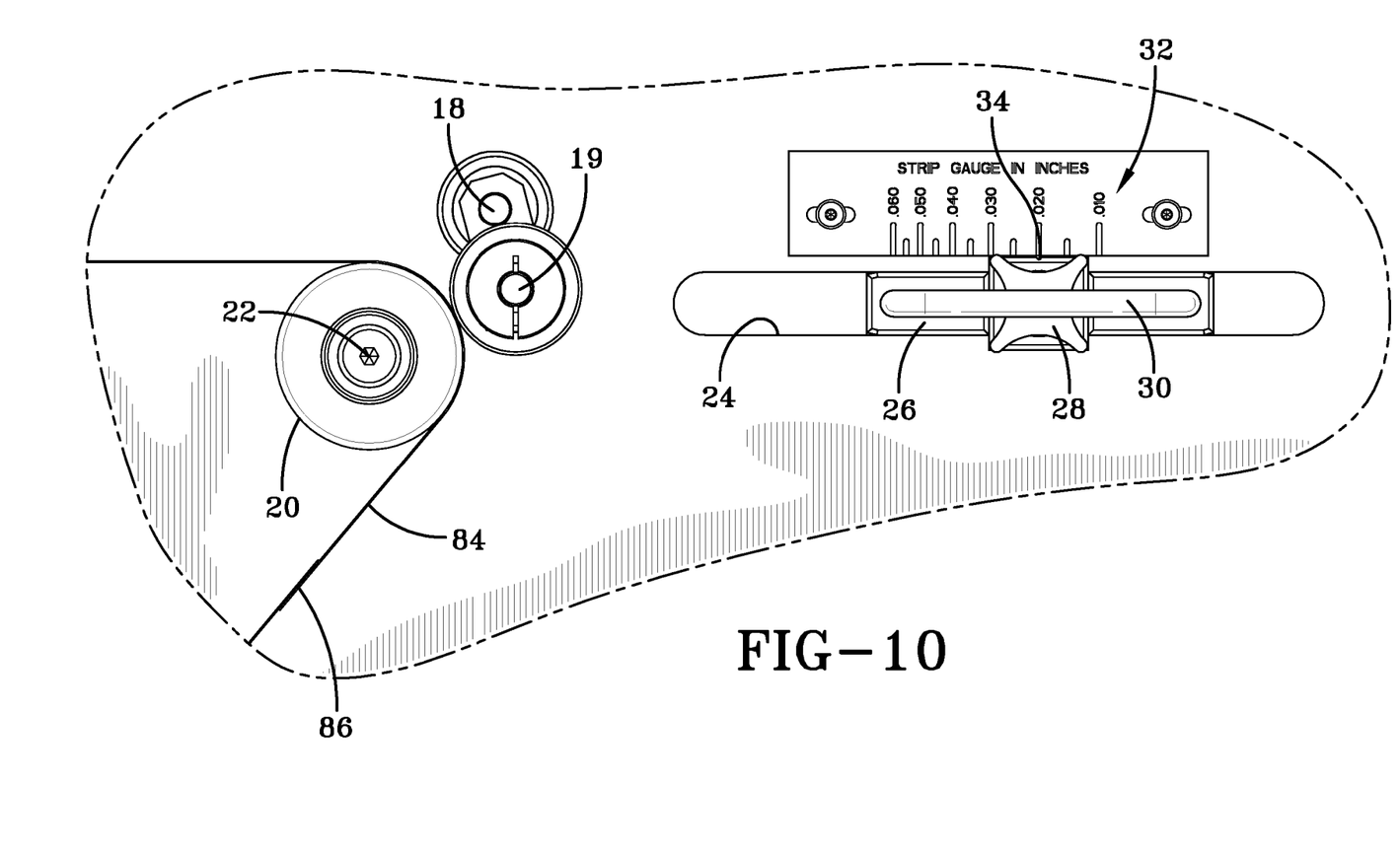
FIG. 10 is a front plan view of the detection device adjusted for a thinner stock utilization.
Figure 11:
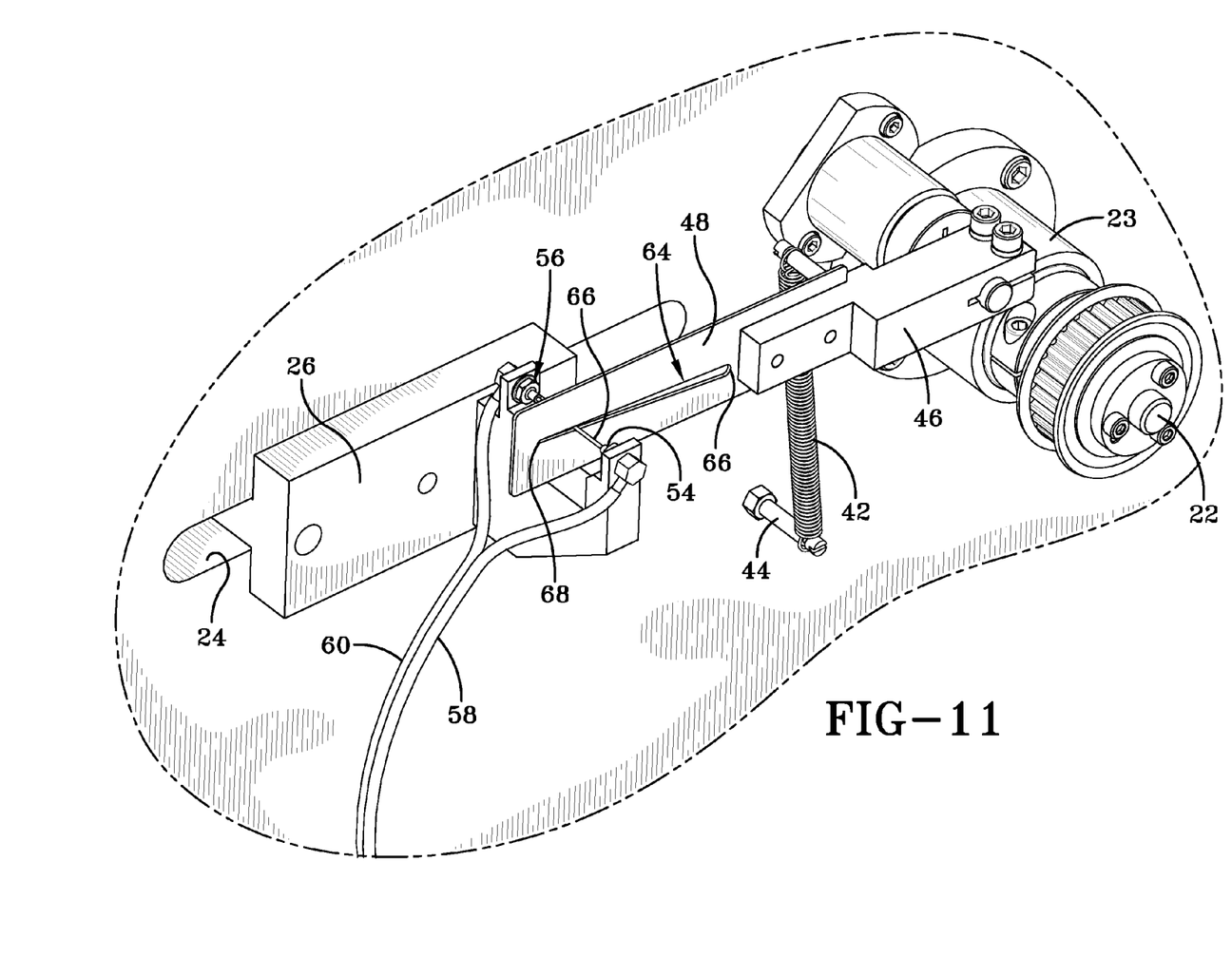
FIG. 11 is a rear perspective view of the detection device adjusted for a thinner stock utilization.

FIGS. 10 and 11 illustrate deployment of the detection device 10 to detect thickness anomaly in a thinner gauge strip or sheet stock 84 having an overlap splice 86 present. The illustrative gauge setting for the FIG. 1 stock thickness is indicated as 0.060 of an inch while, in FIGS. 10 and 11, for illustration purposes the gauge is 0.020 of an inch. For the thinner gauge stock, the bracket 26 is unclamped by clamp 28, moved along the slot 24 until the cursor notch 34 is at the desired thickness. Clamp 28 is tightened to fix the bracket in the desired setting. Movement of the clamp 28, as shown by FIG. 11, moves the photoeye device 52 rearward along the slot 64 of the photoeye mask 48 toward the narrower slot trailing end 68. Light beam 66 remains centered through the narrower portion of slot 64 as shown. The detection device thus is calibrated to detect the thickness of the thinner slot and any anomaly present within the strip such as splice 86 or the absence of the strip in a stock-out situation.

From the foregoing, it will be seen that the detection device 10 detects thickness anomaly within a strip stock region between the roller 20 and the pivotally mounted pinch roller 14. The photoeye mask 46 is mounted to pivotally rotate in either a clockwise or counterclockwise direction responsive to directional pivotal movement of the pinch roller 14, whereby indicating either a splice anomaly within the strip or a stock-out anomaly within the strip. The tapered photoeye slot 64 within the photoeye mask 46 extends between a wider slot leading end and a narrower slot trailing end to accommodate an adjustment of the detection device 10 to strips having differing thickness. The transmitting and receiving optical devices 54, 56 positioned on opposite sides of the photoeye slot 64 operate in an photoeye mask-aligned position to project a narrow, centered through-beam 62 through the photoeye slot 64. Right angled optical device tips 55, 57 to the slot ensure the beam is aligned and sufficiently narrow to pass through any position along the tapering slot. The through-beam 62 is blocked by the photoeye mask as the photoeye mask operatively rotates (in either a clockwise or counter-clockwise direction) a preset deflection angle out of the photoeye mask-aligned position and into a photoeye mask blocking position. For narrower stock thicknesses, the location of the beam 62 through the narrower portions of the slot 64 result in a smaller preset deflection angle required to rotate the photoeye mask between the photoeye mask-aligned and photoeye mask blocking positions.

The tapered photoeye slot 64 and the strip gauge adjustment scale 32 are configured to accomplish two goals with one adjustment when the detection device 10 is set to a different strip gauge. First, a different strip gauge will result in the nominal position of the pinch roller 14 and the photoeye mask 48 to change. The strip gauge adjustment scale markings 32 and the slot angle $\theta$ in the photoeye mask 48 relative to the mask leading edge 50 are set such that the photoeye beam 62 will remain centered in the photoeye slot when the adjustment mechanism is set to match the strip gauge. Secondly, the sensitivity of the detector device 10 must be adjusted as the strip gauge changes to improve sensing reliability. When a thinner strip is used the photoeye is adjusted by moving farther from the pivot shaft 18 of the pinch roller 14. This increases the sensitivity of the device in two ways. First, the farther from the pivot shaft 10 the more the tapered photoeye slot moves for a given change in strip thickness. Secondarily, the slot is tapered and narrower farther away from the pivot, resulting in less motion of the mask required to block the beam. The slot taper angle and slot position are designed to provide approximately the same percentage of gauge change required to block the photoeye for all gauges.

The subject device 10 is useful to detect overlapped splices in any machinery processing flexible strip or sheet materials. Examples in the tire building industry would be spiral overlay or ply appliers or letoffs, but the invention contemplates a wider application potential than the tire industry. The small diameter of the beam 62 minimizes switch hysteresis and improves accuracy while the photoeye mask slot design provides a means to sense dual thickness anomaly such as lap splices and stock-out conditions. The adjustment mechanism utilizing the angled, tapered slot provides both set point and sensitivity modification in a single, readily facilitated adjustment. It will be appreciated that the pinch roller and pivot arm 14, 16 provides for a mechanical amplification to the photoeye mask of the strip thickness changes resulting from a splice or stock-out condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A detection device for detecting a thickness anomaly region within a strip of stock, the device comprising:
   (A) a first roller operatively rotating as the strip of stock passes over a first roller surface;
   (B) a pivotally mounted pinch roller positioned to operatively pivot about a pivot axis against the strip of stock passing over the first roller;
   (C) a photoeye mask substantially extending in a radial direction from the pinch roller pivot axis and positioned to rotate about the pivot axis responsive to pivotal movement of the pinch roller;
   (D) a substantially straight photoeye mask slot within the photoeye mask extending between a slot leading end and a slot trailing end and oriented at an angle with respect to the pinching roller axis of rotation;
   (E) a photoeye device comprising paired transmitting and receiving optical devices, the transmitting and receiving devices positioned on opposite sides of the photoeye slot of the photoeye mask and operative in an photoeye mask-aligned position to project a substantially centered through-beam through the photoeye slot between the transmitting and receiving optical devices; and
   (F) wherein the photoeye slot is adjustably repositionable relative to the photoeye device to operably simultaneously adjust a sensitivity of gauge change measurement and a set point of a nominal stock thickness against which the strip of stock is to be measured.

2. The detection device of claim 1, wherein the through-beam is blocked by the photoeye mask as the photoeye mask operatively rotates a preset deflection angle out of the photoeye mask-aligned position and into a photoeye mask blocking position.

3. The detection device of claim 2, wherein further comprising biasing means for biasing the pinch roller toward the first roller surface.

4. The detection device of claim 2, wherein a magnitude of the preset deflection angle required to rotate the photoeye mask between the photoeye mask-aligned and photoeye mask blocking positions is adjustable.

5. The detection device of claim 4, wherein the photoeye mask slot narrows in width between the leading and trailing ends.

6. The detection device of claim 5, wherein the relative position of the transmitting and receiving optical devices along the photoeye mask slot is adjustable.

7. The detection device of claim 6, wherein the transmitting and receiving optical devices are oriented at right angles to a longitudinal centerline of the photoeye mask slot and the position of the through-beam within the photoeye mask slot operatively calibrates the detection device to differing nominal thicknesses of stock.

8. The detection device of claim 4, wherein the photoeye mask slot narrows in width between the leading and trailing ends and a longitudinal centerline through the photoeye slot is angled with respect to a leading edge of the photoeye mask.

9. The detection device of claim 4, wherein a magnitude of the preset deflection angle required to rotate the photoeye mask between the photoeye mask-aligned and photoeye mask blocking positions is operatively adjustable by varying the position of the transmitting and receiving devices along the photoeye mask slot.

10. The detection device of claim 9, wherein adjustment of the transmitting and receiving optical devices along the photoeye mask slot operatively calibrates the detection device to differing nominal thicknesses of stock.

11. The detection device of claim 10, wherein the photoeye mask slot tapers in width between the leading and trailing ends.

12. The detection device of claim 2, wherein the photoeye mask rotates in opposite first and second directions about the pivot axis responsive to corresponding pivotal movement of the pinch roller in opposite first and second directions.

13. The detection device of claim 12, wherein the through-beam is blocked by the photoeye mask as the photoeye mask operatively rotates through a respective first and a second preset deflection angle in either of the first and second directions out of the photoeye mask-aligned position and into respective first and second photoeye mask blocking positions.

14. The detection device of claim 13, wherein rotation in the first direction of the photoeye mask into the first photoeye mask blocking position is operatively indicative of a stock-out condition between the first roller and the pinch roller.

15. The detection device of claim 14, wherein the rotation in the second direction of the photoeye mask into the second photoeye mask blocking position is operatively indicative of the presence of a splice within the strip of stock between the first roller and the pinch roller.

16. The detection device of claim 15, wherein the magnitude of the first and second preset deflection angles respectively required to rotate the photoeye mask between the photoeye mask-aligned and the first and second photoeye mask blocking positions is adjustable.

17. The detection device of claim 16, wherein the photoeye mask slot tapers in width between the leading and trailing ends.

18. The detection device of claim 17, wherein the relative position of the transmitting and receiving optical devices along the photoeye mask slot and relative distance from the pinch roller is adjustable.

19. The detection device of claim 18, wherein adjustment of the transmitting and receiving optical devices along the photoeye mask slot and relative distance from the pinch roller operatively calibrates the detection device to differing nominal thicknesses of stock.

20. The splice detection device of claim 19, wherein a longitudinal centerline through the photoeye slot is angled with respect to a leading edge of the photoeye mask.

* * * * *